Jan. 4, 1966 T. A. GEARY 3,227,088
RETAINERS FOR SHAFT ELEMENTS
Filed Jan. 13, 1964 2 Sheets-Sheet 1

INVENTOR
THOMAS A. GEARY

BY
*Morrell & Morrell*
ATTORNEYS

Jan. 4, 1966  T. A. GEARY  3,227,088
RETAINERS FOR SHAFT ELEMENTS
Filed Jan. 13, 1964  2 Sheets-Sheet 2
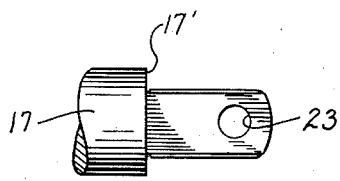
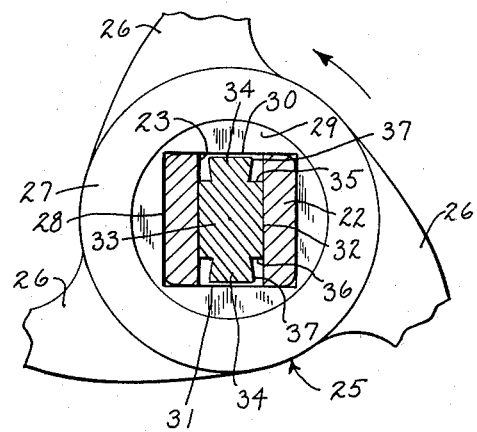
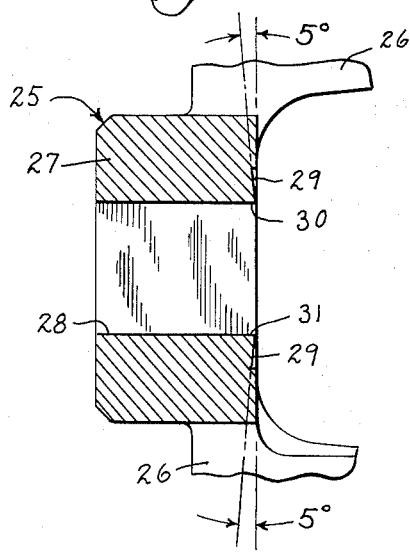
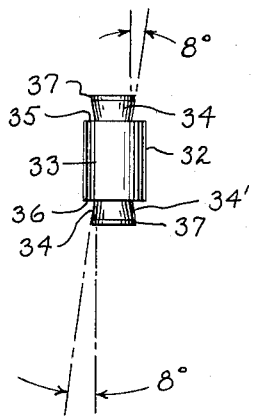
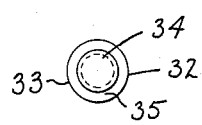
INVENTOR
THOMAS A. GEARY
BY
*Morsell & Morsell*
ATTORNEYS

United States Patent Office 3,227,088
Patented Jan. 4, 1966

3,227,088
RETAINERS FOR SHAFT ELEMENTS
Thomas A. Geary, Kenosha, Wis., assignor to Ladish Co., Cudahy, Wis., a corporation of Wisconsin
Filed Jan. 13, 1964, Ser. No. 337,345
10 Claims. (Cl. 103—103)

This invention relates to Improvements in Retainers for Shaft Elements which are well adapted for use in retaining impellers on shafts of centrifugal pumps.

The principal object of the present invention is to provide an improved retainer including a novel retainer pin for removably locking a shaft element such as an impeller against undue axial movement during operation of the pump, to thereby eliminate the possibility of said impeller engaging and rubbing against the pump casing, the arrangement being such that the impeller can be quickly and easily disassembled and removed from the pump for cleaning or replacement, and the pin being normally maintained in locking position by centrifugal force.

A further object of the invention is to provide an impeller retainer as above described which is designed particularly for use in a sanitary pump, and which has special means therein to prevent the pin from being urged to non-retaining position when a cleaning solution is being pumped through the impeller housing in a reverse direction, as is frequently required to maintain the pump in a sanitary condition.

Still further objects of the present invention are to provide a novel retainer for a shaft element which is simple and inexpensive in design, which is reliable, and which is otherwise particularly well adapted for its intended purposes.

With the above and other objects in view, which other objects and advantages will become apparent hereinafter, the invention comprises the novel retainer for a shaft element illustrated and hereinafter described, and all of its parts and combinations, and any and all modifications or changes therein as come within the spirit of said invention and within the scope of the appended claims.

In the accompanying drawings, illustrating a preferred embodiment of the invention:

FIG. 3 is a fragmentary view of said impeller shaft end portion rotated 45° from the position of FIG. 2;

FIG. 4 is an enlarged transverse sectional view through the impeller shaft, taken along the line 4—4 of FIG. 1, and showing the retaining pin in its "release" position within the retainer pin hole;

FIG. 5 is a longitudinal sectional view through the impeller hub;

FIG. 6 is an elevational view of the novel impeller retaining pin; and

FIG. 7 is an end view of said retaining pin.

Figure 1:
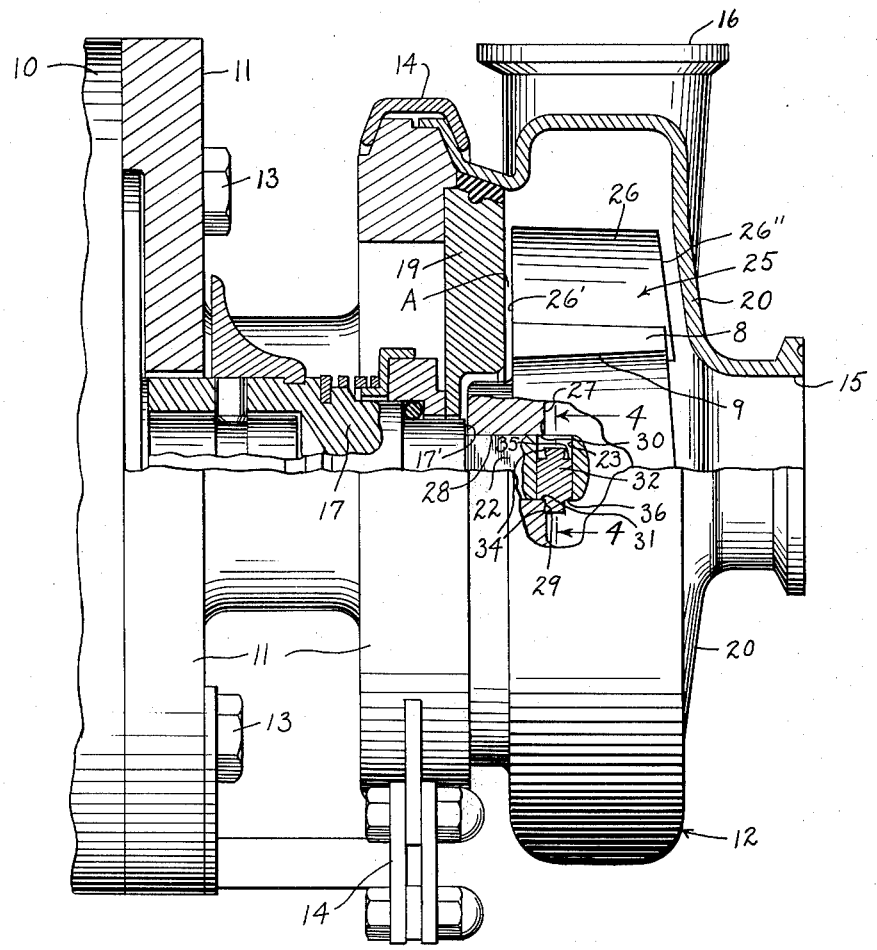
FIG. 1 is a side elevational view of a centrifugal pump incorporating the improved impeller assembly, parts thereof being broken away and shown in vertical longitudinal section.
Figure 2:
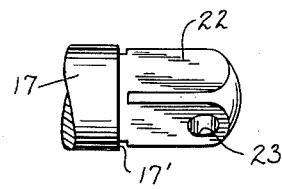
FIG. 2 is a fragmentary side view showing the outer end portion of the impeller drive shaft.

Referring now more particularly to FIG. 1 of the drawings, the numeral 10 designates the housing for the motor of a centrifugal pump, there being a pump adapter unit 11 secured to an end of said motor housing by bolts 13. A circular pump casing 12, usually of stainless steel, having a back plate 19 and front wall 20 is removably retained on said adapter unit by means of a detachable clamping ring 14, such as is well known in the art, and said casing includes an axial inlet 15 projecting from its forward face and a tangential discharge opening 16, said openings being adapted to have fluid conduits (not shown) coupled thereto. The pump mechanism includes a drive shaft 17 suitably connected to the motor and having an outer end in the form of a stub shaft, there being suitable bearing and sealing means therefor, and readily detachably mounted on the outer end of said driveshaft is the impeller 25.

The impeller structure illustrated is preferably of stainless steel and includes a cylindrical body or hub 27 having three curved blades 26 which project forwardly beyond said hub to a point adjacent the front wall 20 of the pump housing. In addition to being curved and being of outwardly-tapering width, the thickness of said blades 26 is tapered forwardly, to provide relatively thick inner edges 26' and outer edges of less thickness, as at 26" (FIG. 1). This also provides end edges 8 shaped as shown in FIG. 1, having angled faces 9 as illustrated. As a result of the tapered design of said blades, fluid entering the pump inlet opening 15 tends to create a force in an inward direction against said impeller during normal operation. When reverse flow is taking place, however, as when the pump is being flushed out and cleaned, the inward force on the relatively slowly moving blades is minimal, and said fluid tends to flow into the space A between the casing back wall 19 and the relatively thick inner edges 26' of the impeller blades to exert an outward thrust on said edges. This situation is an important factor in the design of the present impeller retainer, as will be hereinafter seen.

In the usual operation of a centrifugal pump of the general type illustrated, the impeller blades 26 are rotated at a high rate of speed to draw fluid into the casing 12 through the inlet 15, and the centrifugal force of said rotating blades causes the fluid to be thrown tangentially through the discharge opening 16.

Centrifugal pumps of the general type herein illustrated are widely used in the dairy industry, and in other fields wherein sanitation is critical, and for this reason it is important that the impeller be so designed that it can be easily and quickly detached and removed from the stub shaft for cleaning, or replacement. It is necessary that the impeller be pinned to the drive shaft to prevent undue axial movement and rubbing of the impeller against the front wall 20 of the pump housing, which damages the pump and which occurs most frequently during reverse flow for cleaning. In an effort to overcome this undesirable occurrence, attempts have been made in the past to provide releasable locking means for preventing such axial impeller movement, but said prior devices have not only substantially increased the cost of the assembly, but they are time-consuming and difficult to manipulate. As hereinabove mentioned, it is the principal object of the present invention to provide a simple, inexpensive impeller retainer which permits quick and easy removal of the impeller from the pump when desired, and without the use of any special tools or equipment.

In accordance with the present invention, and referring now more particularly to FIGS. 1–4 of the drawings, it will be seen that the stub end portion 22 of the drive shaft 17 is of reduced size and is of square cross section, there being a transverse pin hole 23 therethrough adjacent its outer end. The impeller hub 27 is provided with a central axial hole 28 which is also square in cross section to permit said impeller to be slidably, non-rotatably mounted on said stub end portion 22, and when said impeller is fitted thereon the inner end of the impeller hub is designed to abut the annular shoulder 17' formed by the enlarged drive shaft portion 17, thereby maintaining limiting inward axial movement of the impeller.

As best appears in FIG. 1, when the impeller 25 is mounted in the pump the outer end portion 22 of the drive shaft projects outwardly beyond said impeller hub, and said interfitting shaft and impeller members are so designed that a portion of the retainer pin hole 23 is located slightly inwardly of the outer face of the impeller hub. Thus oppositely-disposed, short, forwardly-projecting shoulders 30 and 31 are provided by opposite sides of the hub opening 28, one adjacent each end of said retainer pin hole, the function of which will be hereinafter described. As is illustrated in FIG. 5, the outer face of the impeller hub is provided with an annular groove 29 surrounding the axial hole 28, and which groove is outwardly tapered in cross section at an angle of approximately 5°.

In the complete assembly an impeller retainer pin 32, preferably of metal, is freely slidably carried in the retainer pin hole 23, and includes a cylindrical body portion 33 and a pair of inwardly tapered, frusto-conical end members 34, there being annular shoulders 35 and 36 formed between said pin body and end portions, and said pin being of a length slightly less than its hole 23 to fit completely within the stub shaft (FIG. 4) when in neutral or "releasing" position. Said pin is adapted to normally fall to a position wherein one or the other of its ends 34 project from the pin hole 23 adjacent the tapered groove 29 of the hub, and in that instance one or the other of the annular shoulders 35 or 36 of said pin will abut the adjacent marginal shoulder portion 30 or 31, respectively, of the impeller hub (FIG. 1) to prevent said pin from falling out of its hole. The extreme outer end portions 37 of said pin are preferably straight as shown.

To assemble the impeller unit on the pump drive shaft, the user merely inserts the retaining pin 32 into the stub shaft hole 23, and manually holds said pin in a non-projecting position where it is fully contained in said shaft as in FIG. 4. The impeller may then be slipped onto the stub portion of said shaft and shifted inwardly until the hub abuts the drive shaft shoulder 17'. With the impeller thus mounted on the drive shaft, the retaining pin 32 will fall to a position where it projects from one side of said shaft, as illlustrated in FIG. 1, the pin shoulder 35 or 36 engaging a hub shoulder portion 30 or 31 to prevent said pin from falling further out of its hole. When said retaining pin is in its projecting position the impeller is retained between said pin and the shaft shoulder 17', and the impeller is retained against any substantial axial movement, there being a slight amount of play in the space between the pin and the shaft shoulder 17'. The casing 12 may then be mounted in place and the pump is ready for use. During the operation of the pump centrifugal force causes said retaining pin 32 to continuously assume an outwardly-projecting position, thus securely retaining the impeller in position on the stub shaft during the pumping operation.

When it is desired to disassemble the present structure, as when the impeller is to be cleaned or replaced, the pump casing 12 is first removed and the operator then manually urges the retaining pin 32 inwardly to a position where it is fully contained within the stub shaft hole 23, as in FIG. 4. He may then pull the impeller forwardly and off of said drive shaft.

In the use of a centrifugal pump in the dairy industry, or in other liquid food handling equipment, it is necessary to frequently flush the pump out by directing a cleaning solution through said unit in a reverse direction. In that operation the cleaning fluid enters the impeller casing through the outlet opening 16 and a portion will flow into the space A (FIG. 1) between the casing back wall 19 and the edge faces 26' of the impeller blades, thus creating an outward pushing force on the impeller. In order to prevent said outward impeller thrust, in certain situations, from acting on the retaining pin 32, to move it to the inward or "releasing" position of FIG. 4, the novel tapers 34' of the pin and 29 of the hub groove have been provided. Thus the possibility of impeller release has been eliminated, as will now be described.

As hereinabove mentioned, the impeller retaining pin 32 characterizing the present invention is provided with inwardly tapered end portions 34, and as is shown in FIG. 6 said ends are preferably tapered at about an 8° angle as at 34'. The forward face of the impeller hub 27 is provided with the annular recess 29, which preferably has a lesser angle such as the 5° angle illustrated. When the impeller is in its assembled position the tapered projecting end of said retaining pin is positioned immediately adjacent said angled hub groove. When cleaning solution or the like enters the casing in reverse flow, the resulting outward thrust on the impeller causes said angled hub face 29 to forcibly act against the adjacent tapered end portion 34 of the retaining pin, and due to the fact that said tapers are outward the possibility of urging the projecting pin end inwardly is minimized. Such result is augmented because the hub surface angle is less than the cooperating angle 34' of the pin. Thus the tendency is to force said pin radially outwardly. The result is that the retaining pin 32 is prevented from working itself inwardly to the fully contained position within its pin hole 23, as in FIG. 4, and the impeller is retained in position on the drive shaft. It is to be understood, of course, that the exact angles of said coacting hub face and tapered pin ends can be varied, it being desirable, however, that the hub face angle be less than the cooperating pin angle.

From the foregoing description it will be seen that the present invention provides a novel retainer for a shaft element which is particularly suitable for use in a centrifugal pump. With the present assembly not only has the possibility of the impeller shifting axially on the drive shaft and rubbing against the casing wall been eliminated, but the impeller can be quickly and easily disassembled and removed from the pump without any tools or equipment. Moreover, the present impeller structure is simple and inexpensive in design, and it is reliable in operation. It is obvious that various changes and modifications could be made in the design of the illustrated structure without departing from the spirit of the invention, and all of such changes and modifications are contemplated as come within the scope of the following claims.

What I claim is:

1. In a machine having a shaft with a transverse pin hole and having an element with a hub removably slidably mounted on said shaft, means inwardly of the pin hole for limiting said slidable movement in one direction so that in assembled position portions of said hub slightly overlap ends of said pin hole leaving the remainder of said ends exposed, a pin freely slidably mounted in said pin hole and having a main body and having ends of reduced diameter to provide annular shoulders at the ends of said main body which are also overlapped by portions of said hub to normally prevent the pin from falling out of the pin hole, said pin being of a length no greater than the length of said pin hole so that the shaft element may be slidably removed when the pin is manually manipulated to a confined releasing position in said pin hole, and said pin being freely slidable in the pin hole during use so that during rotation of the shaft centrifugal force will cause one or the other of said reduced end portions to project from the pin hole to normally retain the shaft element against axial movement on the shaft and so that when the machine is idle and the pin is out of a horizontal position gravity will urge the pin to retaining position.

2. In a machine having a shaft with a transverse pin hole and having an element with a hub removably slidably mounted on said shaft, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having frusto-conical inwardly tapering ends of reduced diameter to provide annular shoulders at the ends of said main body which are also overlapped by portions of said hub to normally prevent the pin from falling out of the pin hole, said pin being of a length no greater than the length of said pin hole so that the shaft element may be slidably removed when the pin is manually manipulated to a confined releasing position in said pin hole, and said pin being freely slidable in the pin hole so that one or the other of said reduced end portions projects from the pin hole to normally retain the shaft element against axial movement on the shaft, and said hub having an outer face with an annular groove of outwardly tapering cross-section positioned to coact with the taper of the projecting frusto-conical end of the pin to prevent axial thrust of the hub from urging said pin to releasing position in its hole.

3. In a machine having a shaft with a transverse pin hole and having an element with a hub removably slidably mounted on said shaft, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having frusto-conical inwardly tapering ends of reduced diameter to provide annular shoulders at the ends of said main body which are also overlapped by portions of said hub to normally prevent the pin from falling out of the pin hole, said pin being of a length no greater than the length of said pin hole so that the shaft element may be slidably removed when the pin is manually manipulated to a confined releasing position in said pin hole, and said pin being freely slidable in the pin hole so that one or the other of said reduced end portions projects from the pin hole to normally retain the shaft element against axial movement on the shaft, and said hub having an outer face with an annular groove of outwardly tapering cross-section positioned to coact with the taper of the projecting frusto-conical end of the pin to prevent axial thrust of the hub from urging said pin to releasing position in its hole, the angle of the cross-sectional taper of said groove being less than the angle of the taper of said frusto-conical pin ends.

4. In a machine having a shaft with a transverse pin hole and having an element with a hub removably slidably mounted on said shaft, means inwardly of the pin hole for limiting said slidable movement in one direction so that in assembled position portions of said hub slightly overlap ends of said pin hole leaving the remainder of said ends exposed, a pin freely slidably mounted in said pin hole and having a main body and having an end of reduced diameter to provide an annular shoulder at the end of said main body which is also overlapped by portions of said hub to prevent the pin from falling out of the pin hole, said pin being of a length no greater than the length of said pin hole so that the shaft element may be slidably removed when the pin is manually manipulated to a confined position in said pin hole, and said pin being freely slidable in the pin hole during use so that during rotation of the shaft centrifugal force will cause said reduced diameter end portion to project from the pin hole to normally retain the shaft element against axial movement on the shaft.

5. In a machine having a rotatable shaft with a transverse pin hole and having an element with a hub removably slidably mounted on said shaft for rotation therewith, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having ends of reduced diameter to provide annular shoulders at the ends of said main body which are also overlapped by portions of said hub to normally prevent the pin from falling out of the pin hole, said pin being of a length no greater than the length of said pin hole so that the shaft element may be slidably removed when the pin is manually manipulated to a confined position in said pin hole, and said pin being freely slidable in the pin hole so that centrifugal force causes one or the other of said reduced diameter end portions to project from the pin hole during operation to normally retain the shaft element against axial movement on the shaft.

6. In a machine having a rotatable shaft with a squared end and with a transverse pin hole and having an element with a hub removably slidably mounted on said shaft for rotation therewith, said hub having a squared bore for receiving said squared shaft end, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having ends of reduced diameter to provide annular shoulders at the ends of said main body which are also overlapped by portions of said hub on opposite sides of the squared bore to normally prevent the pin from falling out of the pin hole, said pin being of a length no greater than the length of said pin hole so that the shaft element may be slidably removed when the pin is manually manipulated to a confined position in said pin hole, and said pin being freely slidable in the pin hole so that centrifugal force causes one or the other of said reduced diameter end portions to project from the pin hole during operation to normally retain the shaft element against axial movement on the shaft.

7. In a pump having a drive shaft with a transverse pin hole and having an impeller with a hub removably slidably mounted on said shaft for rotation therewith, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having ends of reduced diameter to provide annular shoulders at the ends of said main body which are also overlapped by portions of said hub to normally prevent the pin from falling out of the pin hole, said pin being of a length no greater than the length of said pin hole so that the impeller may be slidably removed when the pin is manually manipulated to a confined position in said pin hole, and said pin being freely slidable in the pin hole so that centrifugal force causes one or the other of said reduced diameter end portions to project from the pin hole during operation to normally retain the impeller against axial movement on the shaft.

8. In a pump having a drive shaft with a transverse pin hole and having an impeller with a hub removably slidably mounted on said shaft for rotation therewith, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having frusto-conical inwardly tapering ends of reduced diameter to provide annular shoulders at the ends of said main body which are also overlapped by portions of said hub to normally prevent the pin from falling out of the pine hole, said pin being of a length no greater than the length of said pin hole so that the impeller may be slidably removed when the pin is manually manipulated to a confined position in said pin hole, and said pin being freely slidable in the pin hole so that centrifugal force causes one or the other of said reduced diameter end portions to project from the pin hole during operation to normally retain the impeller against axial movement on the shaft, and said hub having an outer face with an annular groove of outwardly tapering cross-section positioned to coact with the taper of the projecting frusto-conical end of the pin to prevent axial thrust of the hub from urging said pin to releasing position in its hole.

9. In a pump having a drive shaft with a transverse pin hole and having an impeller with a hub removably slidably mounted on said shaft for rotation therewith, means inwardly of the pin hole for limiting said slidable movement in one direction so that in assembled position portions of said hub slightly overlap ends of said pin hole leaving the remainder of said ends exposed, a pin slidably mounted in said pin hole and having a main body and having frusto-conical inwardly tapering ends of reduced diameter to provide annular shoulders at the ends of said main body which are also overlapped by portions of said hub to normally prevent the pin from falling out of the pin hole, said pin being of a length no greater than the length of said pin hole so that the impeller may be slidably removed when the pin is manually manipulated to a confined position in said pin hole, and said pin being freely slidable in the pin hole so that centrifugal force causes one or the other of said reduced diameter end portions to project from the pin hole during operation to normally retain the impeller against axial movement on the shaft, and said hub having an outer face with an annular groove of outwardly tapering cross-section positioned to coact with the taper of the projecting frusto-conical end of the pin to prevent axial thrust of the hub from urging said pin to releasing position in its hole, the angle of the cross-sectional taper of said groove being less than the angle of the taper of said frusto-conical pin ends.

10. In a machine having a shaft with a transverse pin hole and having an element with a hub removably slidably mounted on said shaft, means inwardly of the pin hole for limiting said slidable movement of the shaft element in one direction, a pin having ends, said pin being freely slidably mounted in said pin hole during use whereby during rotation of the shaft centrifugal force will cause a pin end to normally project from the pin hole in a position to retain the shaft element against slidable movement in the other direction on the shaft, and means for normally preventing the pin from falling completely out of the pin hole, said pin being of a length no greater than the length of said pin hole so that the shaft element may be slidably removed when the pin is manually manipulated to a confined position in said pin hole.

References Cited by the Examiner
UNITED STATES PATENTS
2,474,360 6/1949 Jamison _____ 287—52.08

DONLEY J. STOCKING, *Primary Examiner.*
HENRY F. RADUAZO, *Examiner.*